July 23, 1957  A. O. CHAMPION  2,800,142
PRESSURE REGULATING AND CHECK VALVE
Filed Nov. 15, 1954
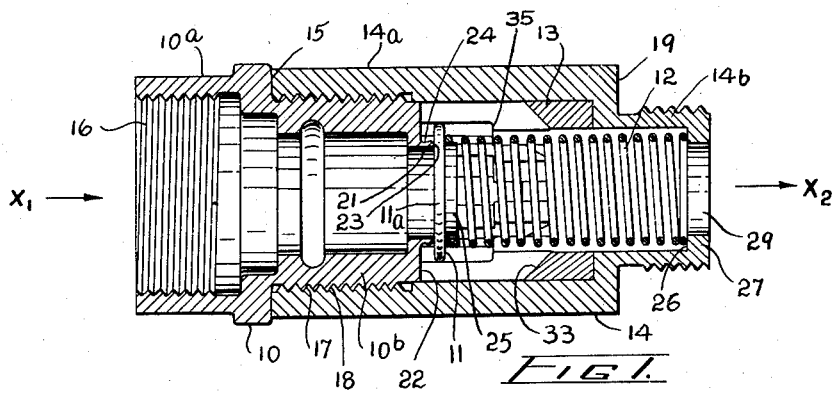
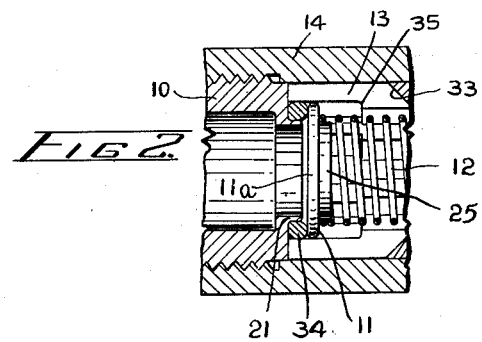
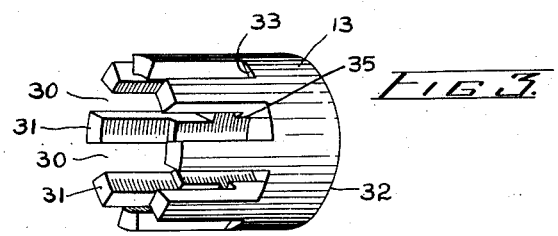
INVENTOR
ALEXANDER O. CHAMPION
BY
*Maybee & Legris*
ATTORNEYS

United States Patent Office 2,800,142
Patented July 23, 1957

2,800,142

PRESSURE REGULATING AND CHECK VALVE

Alexander Osmond Champion, Islington, Toronto, Ontario, Canada, assignor to A. V. Roe Canada Limited, Malton, Ontario, Canada, a corporation Application November 15, 1954, Serial No. 468,969

1 Claim. (Cl. 137—543.19)

This invention relates to valves and in particular to valves of the type known as pressure regulating and check valves.

Valves of this type commonly in use suffer from two main disadvantages. Firstly, they are usually cumbersome and occupy more space than is desirable and, secondly they are limited by their construction to application in fluid lines carrying only certain types of fluid. These fluids may be divided roughly into two main classes, those contaminated by sediment and those free from sediment. If the fluid is sediment-carrying it is preferable to employ a resilient valve seat as, otherwise, the sediment particles will prevent a tight closing of the valve and leakage will result. It is, however, sometimes desirable to avoid the use of a resilient valve seat as some liquids have a deteriorating effect upon the resilient material.

In order to meet the various requirements dictated by the type of fluid encountered, several types of valves are necessary at the present time, thus greatly increasing the cost of manufacturing devices employing such valves. Servicing of such devices is also complicated by the necessity of maintaining a stock of several types of valves for replacement. It is, therefore, a primary object of the present invention to provide a valve that may be adapted for use in any of the circumstances normally encountered in fluid systems.

Another object of the invention is to provide a valve which is of the in-line type and which, therefore, occupies a minimum of space.

The mode of overcoming the disadvantages common to present-day valves and the advantages inherent in the valve which is the subject of this invention will be apparent from the following description of the preferred embodiment when read in conjunction with the appended drawings in which like reference numerals denote like parts in the various views and in which:

Fig. 1 is a longitudinal cross-section view of the valve without a resilient valve seat;

Fig. 2 is a detail of a portion of Fig. 1 with the resilient valve seat in position, and Fig. 3 is a perspective view of the valve core.

Referring now to the accompanying drawings and in particular to Fig. 1 it will be seen that the valve comprises five main parts. These are the valve body 10, the flat piston 11, the spring 12, the core 13 and the casing 14.

The body 10 is of substantially cylindrical form having a step 15 near the center of its length thus forming it into two portions 10a and 10b, the portion 10a being of larger diameter than the portion 10b. Portion 10a is internally threaded at 16 while portion 10b is externally threaded at 17. Threads 16 are adapted to be engaged by one end of a fluid line which is not shown in the drawings. The direction of flow of fluid in the line is, however, indicated by the arrows X1 and X2 in Fig. 1. The threads 17 are engaged by internal threads 18 on the casing 14. The casing 14 is also substantially cylindrical and has a step 19 along its length so that the casing 14 is divided into two sections 14a and 14b with section 14a being the larger and section 14b being the smaller. Section 14a carries the internal threads 18 which engage threads 17 on body 10.

An annular valve seat or flange 21 is formed on one end 22 of body 10 extending parallel to the axis of the valve. The inner surface of the valve seat 21 is preferably substantially parallel to the axis of the valve and defines the fluid flow passage. The outer surface of seat 21 is tapered or sloped from a sharp edge 23 which acts as the valve seat towards its base at the end 22 of the body, so that the seat 21 is thinner near its base than at an intermediate location between its base and the edge 23, thus forming a shallow groove 24 running around the exterior surface of the seat near the base of the seat. This groove is designed to accommodate a sealing ring which will be described in detail below.

The piston 11 is in the form of a flat disc or plate having a flat face 11a which bears against the valve seat and on its opposite face a boss 25; the boss extends into the end of a helical compression spring 12 co-axially disposed with respect to the piston 11. The other end of this spring bears upon the end face 26 of a flange 27 which is formed in section 14b of the casing 14. A central aperture 29 is provided in the flange 27 to allow the fluid to flow therethrough. By using a spring which is substantially longer than the length of the travel of the piston, a uniformity of elasticity is obtained throughout the piston movement. This results in a uniform flow of fluid through the valve for any given pressure in excess of that at which the valve opens.

The valve core 13 lies within section 14a of the casing 14 and surrounds the spring 12; it is cylindrical in shape and has a plurality of notches or crenellations 30 cut therein as clearly shown in Fig. 3. The crenellated end 31 of the core 13 lies in abutment with end 22 of the valve body 10 while the end 32 of the core is in abutment with the inner surface of step 19 of casing 14. An internal shoulder 35 limits the movement of the piston and fixes the extreme open position. The core 13 serves three purposes: firstly, it provides a guide and a stop for the movement of the flat piston 11, secondly, by means of the slots or crenellations 30 it provides a path for the fluid flowing through the valve around the piston 11 and thirdly, it ensures, again by virtue of the slots or crenellations, that the flow of fluid through the valve is parallel to the axis. The end faces 33 of the slots 30 are bevelled in the direction of flow to ensure that there is a minimum of turbulence within the valve.

Referring now to Fig. 2, a detail of the valve seat is shown in which a resilient sealing ring 34 has been placed over the valve seat 21 and is lying in groove 24. When ring 34 is in this position the face 11a of piston 11 bears thereagainst under the force of the spring 12 to make the closure of the valve. The ring 34 is of a thickness greater than the height of flange 21 and, thus, the piston 11 bears against the sealing ring rather than against edge 23 of the flange 21.

The ring 34 is removable and the valve can be employed either with a resilient valve seat with the ring in position when sediment contaminated fluids are encountered or when the fluids are not deteriorating to the resilient material. If the fluids do not contain sediments or if they are deteriorating to the resilient material, the ring may be removed and a metal-to-metal seal employed. Since the edge 23 of the valve seat or flange 21 has been made fairly sharp the metal-to-metal seal may be employed even with sediment contaminated fluids provided the sediment particles are not excessively large and hard.

To assemble the valve, the spring 12 is inserted in the casing and the valve core 13 is slipped over the spring 12 and seated with end 32 abutting the inner surface of step 19 in the casing. The piston 11 is placed with boss 25 within spring 12 and the portion 10b of the body is threaded into section 14a of the casing and tightened. The fluid line is then engaged at one end with threads 16 and at the other end of the valve with threads 35 which are cut in the exterior surface of portion 14b of the casing. By engaging the line to the valve in this manner the valve is of the in-line type and therefore overcomes the disadvantage of bulkiness of the prior art valve. The valve described herein occupies no more space than a section of the fluid line itself.

When in operation, the spring 12, urging piston 11 into engagement with the valve seat, will prevent flow of fluid until the fluid pressure exceeds the spring pressure. When this occurs the piston 11 will be forced away from the valve seat against the pressure of the spring and the fluid will flow around the piston 11. The crenellations or slots 30 in the core 13 will ensure an axially parallel flow with a minimum of turbulence.

From the foregoing description it will be seen that a valve has been invented which is convertible from a resilient seat to a metal seat to enable it to be adapted to accommodate any of the situations that may arise in use. While the embodiment described herein is illustrative of the preferred form of the invention, many modifications are possible without departing from the spirit of the invention or the scope of the following claim.

What I claim as my invention is:

A pressure regulating and check valve comprising a valve body of stepped cylindrical form having a portion of larger diameter and a portion of smaller diameter, internal threads on the portion of larger diameter and external threads on the portion of smaller diameter, an axially extending annular valve seat projecting from the end face of the portion of smaller diameter of the valve body and defining a flow passage, the valve seat being formed with a relatively sharp edge and having a shallow annular groove around its external surface adapted to receive a resilient ring of a diameter slightly greater than the axial extension of the valve seat, a cylinder forming an axial continuation of the flow passage defined by a casing adapted to be engaged with the external threads on the portion of the valve body of smaller diameter, the casing being also of stepped cylindrical form having an internal shoulder separating a portion of larger diameter carrying internal threads adjacent its end and a portion of smaller diameter carrying external threads adjacent its end, an inwardly extending annular flange defining a flow passage at the end of smaller diameter of the casing, a flat disc-type piston lying within the casing and urged towards the valve seat by means of a compression coil spring bearing at one end on the surface of the piston remote from the valve seat and at the other end on the surface of the annular flange adjacent the valve seat, an open ended, cylindrical valve core having circumferentially spaced crenellations at one end and lying within the casings surrounding the flat piston and the spring, the core having its crenellated end in abutment with the end face of the valve body carrying the valve seat and its opposite end abutting the shoulder on the casing separating the portions of larger and smaller diameter, the internal surface of the core being provided with an inwardly extending shoulder substantially midway between the crenellated end and the base of the crenellations to provide a stop to limit the movement of the piston, the base of the crenellations being sloped in the direction of flow to reduce turbulence, the length of the spring being greater than the distance travelled by the valve between the closed position and the extreme open position.

References Cited in the file of this patent

UNITED STATES PATENTS

| | | |
|---|---|---|
| 556,024 | Pew | Mar. 10, 1896 |
| 776,377 | Beers | Nov. 29, 1904 |
| 1,269,616 | Le Bozec | June 18, 1918 |
| 2,608,376 | Adams | Aug. 26, 1952 |
| 2,649,277 | Blackford | Aug. 18, 1953 |